United States Patent
Ahn

(10) Patent No.: US 9,207,761 B2
(45) Date of Patent: Dec. 8, 2015

(54) CONTROL APPARATUS BASED ON EYES AND METHOD FOR CONTROLLING DEVICE THEREOF

(71) Applicant: Electronics and Telecommunications Research Institute, Daejeon (KR)

(72) Inventor: Chang-Geun Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 64 days.

(21) Appl. No.: 14/018,302

(22) Filed: Sep. 4, 2013

(65) Prior Publication Data

US 2014/0132511 A1    May 15, 2014

(30) Foreign Application Priority Data

Nov. 14, 2012    (KR) .................. 10-2012-0128990

(51) Int. Cl.
| | |
|---|---|
| G06F 3/033 | (2013.01) |
| G09G 5/08 | (2006.01) |
| G06F 3/01 | (2006.01) |
| G06F 3/0487 | (2013.01) |
| G06F 3/0484 | (2013.01) |

(52) U.S. Cl.
CPC .............. *G06F 3/013* (2013.01); *G06F 3/0487* (2013.01); *G06F 3/04842* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 5,839,000 A | * | 11/1998 | Davis et al. ..................... | 396/51 |
| 2003/0156257 A1 | * | 8/2003 | Levola .......................... | 351/210 |
| 2008/0252850 A1 | * | 10/2008 | Plagwitz et al. .............. | 351/210 |

FOREIGN PATENT DOCUMENTS

| | | |
|---|---|---|
| JP | 2008-233081 A | 10/2008 |
| KR | 10-2011-0019316 A | 2/2011 |

* cited by examiner

*Primary Examiner* — Kenneth B Lee, Jr.

(57) ABSTRACT

The present invention relates to an eye-gaze based control device. The eye-gaze based control device of the present invention may control a control target device according to an eye-gaze point of a user. Here, the eye-gaze based control device controls the control target device by controlling a size of an image displayed to the user, thereby more precisely controlling the control target device.

13 Claims, 4 Drawing Sheets

CONTROL APPARATUS BASED ON EYES AND METHOD FOR CONTROLLING DEVICE THEREOF

CROSS-REFERENCE TO RELATED APPLICATIONS

This U.S. non-provisional patent application claims priority under 35 U.S.C. §119 of Korean Patent Application No. 10-2012-0128990, filed on Nov. 14, 2012, the entire contents of which are hereby incorporated by reference.

BACKGROUND OF THE INVENTION

The present invention disclosed herein relates to a control system, and more particularly, to an eye-gaze based control device for precisely controlling devices and a device control method thereof.

An eye-gaze tracking technology for detecting and tracking an eye gaze was initially used for aiding the disabled, but is now also used for surveying the usability of products and deriving responses of customers in the field of marketing.

With the development of technology, hardware has been gradually developed. Accordingly, devices to which the eye-gaze tracking technology may be applied increase. Further, with the development of eye-gaze detecting technology, the accuracy of eye-gaze tracking has been improved.

However, typical eye-gaze tracking technologies are only used in the fields of psychological analysis of users, e.g. usability survey, preference survey, market research, psychiatry, and psychology. Therefore, it is difficult to utilize the typical eye-gaze tracking technologies as general interface technologies.

In addition, the typical eye-gaze tracking technologies only provide simple control functions such as mouse cursor control, volume control, and channel switching of display devices such as televisions. Therefore, the typical eye-gaze tracking technologies may not be applied to various devices and are particularly limited in terms of precise control of various devices.

SUMMARY OF THE INVENTION

The present invention provides an eye-gaze based control device for precisely controlling devices and a device control method thereof.

Embodiments of the present invention provide eye-gaze based control devices including an image generation unit configured to generate an image with which a device coordinate system for controlling a device is synchronized, a device control unit configured to control an operation of generating the image according to an inputted control signal and output, to the device, a device control signal for controlling the device according to the control signal, an image output unit configured to output the image, an eye-gaze point detection unit configured to detect an eye-gaze point of a user corresponding to the outputted image and detect a coordinate of the detected eye-gaze point, a control command input unit configured to receive a user control command, and a coordinate value calculation unit configured to generate, by matching the eye-gaze point with the device coordinate system, the control signal corresponding to the user control command and the matched eye-gaze point coordinate, wherein the control signal includes a signal for controlling one of operations of magnifying and reducing the image on the basis of the eye-gaze point coordinate.

In some embodiments, the image generation unit may include a spatial coordinate application unit configured to apply a spatial coordinate system to inputted image data, and a coordinate synchronization unit configured to generate an image by synchronizing the spatial coordinate system of the image data with the device coordinate system for controlling the device.

In other embodiments, the eye-gaze based control device may further include a camera unit configured to generate the image data by capturing an actual image.

In still other embodiments, the control signal may include a signal for controlling an operation of moving the image on the basis of the eye-gaze point coordinate.

In even other embodiments, the image output unit may include at least one of a flat panel display and a head mounted display.

In yet other embodiments, in the control signal for controlling the operation of magnifying the image, a magnification ratio of the image may be set on the basis of the eye-gaze point coordinate.

In further embodiments, a degree of device control precision of the device control signal may be changed according to the magnification ratio when a user command signal is inputted through the image magnified according to the magnification ratio.

In other embodiments of the present invention, device control methods of an eye-gaze based control device includes generating an image to which a device coordinate system is synchronized, obtaining an eye-gaze point of a user from the image, controlling a size of the image on the basis of the eye-gaze point when a user control command for controlling the size of the image is inputted, obtaining the eye-gaze point coordinate from the eye-gaze point of the user through output of the size-controlled image, generating a device control signal for controlling a device by matching the eye-gaze point coordinate with the device coordinate system when a user control command for controlling the device is inputted, and outputting the generated device control signal to the device to be controlled.

In some embodiments, the generating of an image may include applying a spatial coordinate system to each region of the inputted image data, and generating the image through synchronization of the spatial coordinate system of the image data and the device coordinate system.

In other embodiments, the inputted image data may be image data obtained by capturing an actual image through a camera.

In still other embodiments, the user control command for controlling the size of the image may be a command for performing one of operations of magnifying and reducing the image on the basis of the eye-gaze point coordinate.

In even other embodiments, the controlling of a size of the image may include magnifying or reducing the image by a magnification ratio set to control the size of the image on the basis of the eye-gaze point coordinate.

In yet other embodiments, a degree of device control precision of the device control signal may be changed according to the magnification ratio when a user command signal is inputted through the image magnified according to the magnification ratio.

In further embodiments, the device control method may further include moving the image according to a moving operation when the user control command is for moving the image on the basis of the eye-gaze point coordinate.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. It should be noted that the present invention will be described as concisely as possible without providing unnecessarily detailed descriptions so as not to obscure the concept of the present invention.

Figure 1:
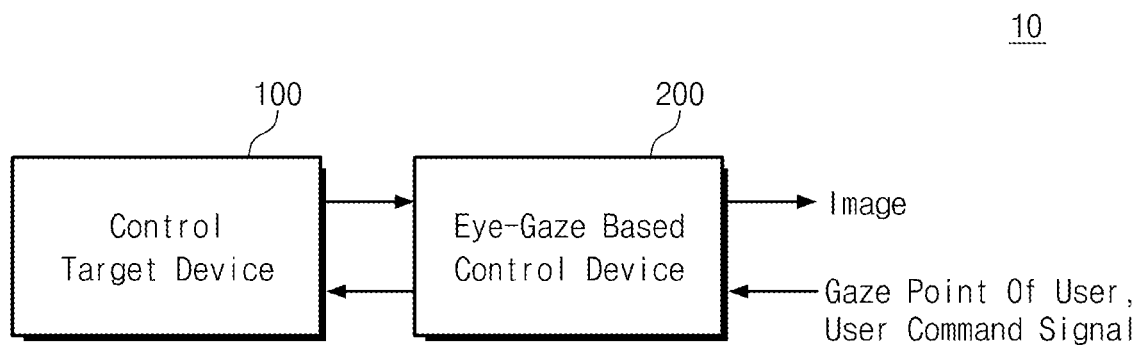
FIG. 1 is a diagram illustrating a control system according to an embodiment of the present invention.

FIG. 1 is a diagram illustrating a control system according to an embodiment of the present invention.

Referring to FIG. 1, a control system 10 includes a control target device 100 and an eye-gaze based control device 200.

The control target device 100 is operated according to control by the eye-gaze based control device 200. The control target device 100 includes all devices that may be controlled based on an eye gaze of a user. For example, the control target device 100 may be any of display devices such as monitors and televisions or short-range or long-range devices such as broadcast cameras, surgical robots, undersea exploration robots, fire extinguishing robots, and military robots.

The eye-gaze based control device 200 controls the control target device 100 according to an eye gaze point of a user. To this end, the eye-gaze based control device 200 provides an image for eye gaze control to the user and detects the eye gaze point of the user on the image. The eye-gaze based control device 200 may precisely control the control target device 100 according to a user control command through a magnifying operation and a reducing operation based on the eye gaze point. Further, the eye-gaze based control device 200 may perform an image moving operation based on the eye gaze point in order to provide an image for controlling the control target device 100.

Through this operation, the eye-gaze based control device 200 may improve control precision of the control target device 100 by as much as a magnification ratio of an image by using the image of which a size is controlled through the image magnifying or reducing operation based on a user eye-gaze point. Here, an integer value of the magnification ratio which is greater than '1' represents the image magnifying operation and the integer value of the magnification ratio which is smaller than '1' represents the image reducing operation.

Therefore, the eye-gaze based control device 200 may more precisely control devices by controlling a size of an image provided to the user.

Figure 2:
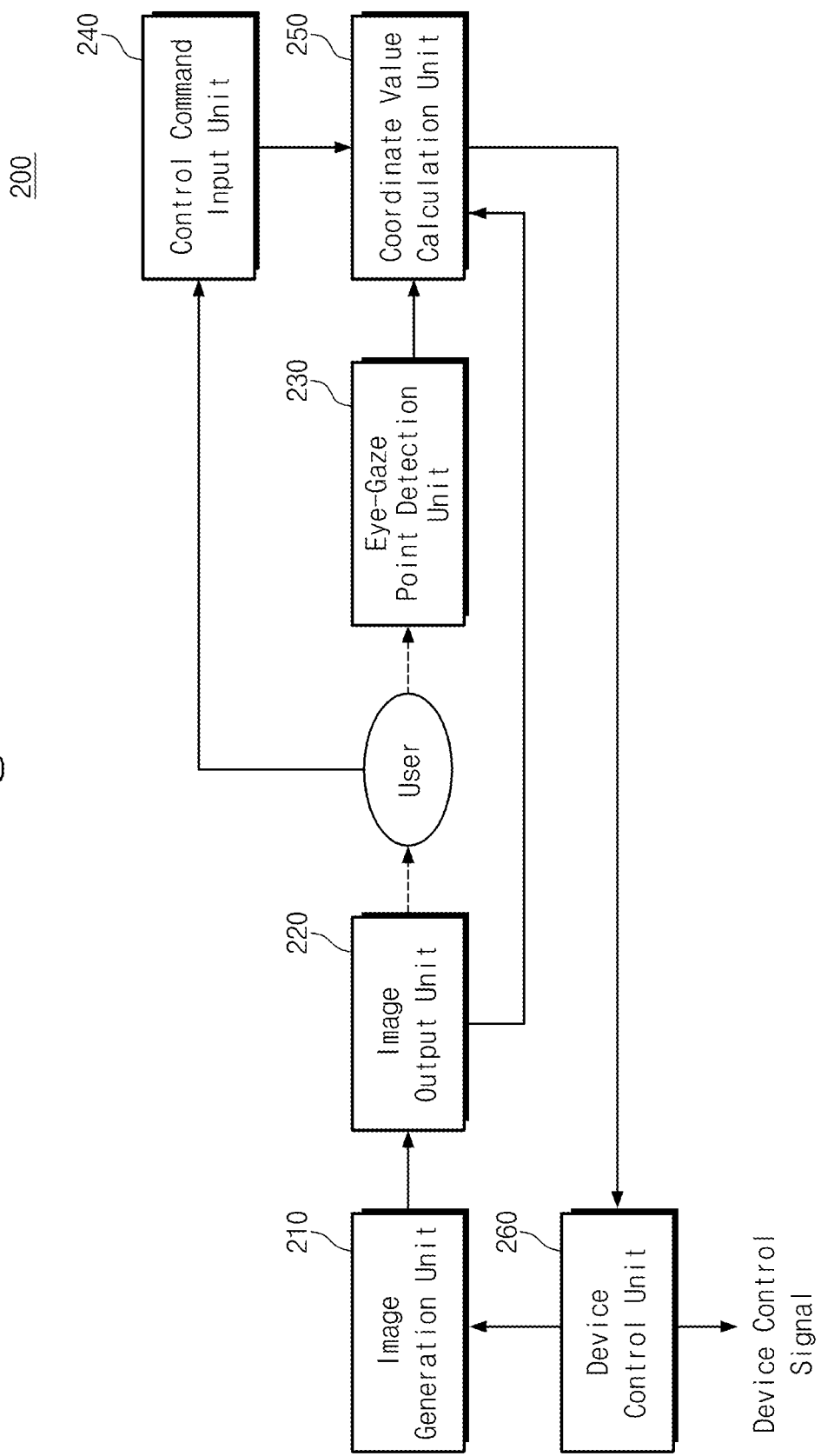
FIG. 2 is a diagram illustrating an eye-gaze based control device according to an embodiment of the present invention.

FIG. 2 is a diagram illustrating the eye-gaze based control device according to an embodiment of the present invention.

Referring to FIG. 2, the eye-gaze based control device 200 includes an image generation unit 210, an image output unit 220, an eye-gaze point detection unit 230, a control command input unit 240, a coordinate value calculation unit 250, and a device control unit 260.

The image generation unit 210 applies a spatial coordinate system to inputted image data. Further, the image generation unit 210 generates an image to be provided to the user by synchronizing the spatial-coordinate-applied image data with a device coordinate. The image generation unit 210 provides the generated image to the image output unit 220.

The image output unit 220 outputs, to the user, the image provided from the image generation unit. To this end, the image output unit 220 may include a display unit for displaying the image. For example, the image output unit 220 may include a flat panel display and a head mounted display.

Here, image output unit 220 configured with the head mounted display does not require an operation of compensating a motion of a user head, thereby reducing the complexity of tracking an eye gaze of the user.

The image output unit 220 provides, to the coordinate value calculation unit 230, an image to match a device coordinate system in the image with a coordinate (i.e. eye-gaze point coordinate) of a user eye-gaze point.

The eye-gaze point detection unit 230 detects an eye-gaze point of the user in an image reproduction region (or, an image) of the image output unit. The eye-gaze point detection unit 230 may detect the eye-gaze point of the user in the image reproduction image through the detection of the eye-gaze point. The eye-gaze point detection unit 230 outputs the detected eye-gaze point to the coordinate value calculation unit 250.

The control command input unit 240 receives a user control command. For example, the control command input unit 240 includes a microphone for receiving the user control command via voice and includes a keypad, a touchpad, and a button for receiving the user control command via key input. Further, the control command input unit 240 may receive the user control command through a touchpen or a mouse. The control command input unit 240 may include a sensor for detecting a motion of a user. The control command input unit 240 may receive the user control command by detecting an eye blink, hand motion, or foot motion of the user through the motion detecting sensor.

The user control command inputted to the control command input unit 240 includes a user control command for controlling an operation of a device and a user control command for controlling an operation of generating an image provided to the user. Such a user control command is received from the user on the basis of an eye-gaze point of the user.

The control command input unit 240 outputs the user control command to the coordinate value calculation unit 250.

The coordinate value calculation unit 250 matches the device coordinate system in the image with the eye-gaze point coordinate. Here, the eye-gaze point coordinate is a coordinate for controlling the control target device. To this end, the coordinate value calculation unit 250 may be provided with the image to which the device coordinate system is applied through the image output unit 220. The coordinate value calculation unit 250 generates a control signal on the basis of matched eye-gaze point coordinate with the device coordinate system. The coordinate value calculation unit 250 outputs the generated control signal to the device control unit 260.

The device control unit 260 may control an operation of the image generation unit 210 or an operation of the control target device 160 in response to the control signal.

When the control signal for an operation of magnifying, reducing, or moving (dragging) an image is inputted, the device control unit 260 generates an image control signal for magnifying, reducing, or moving (dragging) the image generated in the image generation unit 230 on the basis of the eye-gaze point coordinate. The device control unit 260 may output the image control signal to the image generation unit 230.

The device control unit 260 generates a device control signal for performing an operation of a corresponding device with the device coordinate system corresponding to the eye-gaze point coordinate. The device control unit 260 outputs the device control signal to the control target device 100.

When the eye-gaze based control device 200 is located far from the user, a part of the image generation unit 210 and the device control unit 260 may be combined or connected to the control target device 100. Here, the image generation unit 210 and the device control unit 260 may transmit and receive signals by wire or wirelessly.

Here, in the image obtained by controlling the size of the image outputted through the image output unit 230 according to a magnification ratio set by a user, the control command input unit 240 receives a user command signal. Here, the device control signal outputted from the device control unit 260 is based on the user control command inputted on the basis of the size-controlled image, and thus a degree of precision of device control varies corresponding to the magnification ratio.

Here, when it is assumed that the magnification ratio is double magnification, the degree of precision of the control target device 100 may be two times improved (a minimal movement section and a control speed are reduced by half) by the device control signal generated from the user control command inputted through the image.

Accordingly, the eye-gaze based control device 200 of the present invention may precisely control the control target device 100.

Next, a case where the eye-gaze based control device 200 of the present invention is applied to a broadcast camera is exemplarily described.

The control target device controlled by the device control unit 260 may be a broadcast camera (including a camera and camera control devices (a camera support for moving and rotating the camera, etc.)). In this case, the device control signal and the image control signal may be regarded as one signal.

Image data captured by the broadcast camera on the basis of a reference point with respect to a user (camera technician) is outputted to the image generation unit 210. Here, the image generation unit 210 generates an image to which a coordinate for controlling the device is mapped is generated.

The image output unit 220 outputs, to the user, the image generated in the image generation unit 210.

Here, the eye-gaze point detection unit 230 detects an eye-gaze point of the user. The eye-gaze point detection unit 230 detects the eye-gaze point of the user in real time when the eye-gaze point moves. The control command input unit 240 may receive the user control command such as magnification, movement, or reduction on the basis of the eye-gaze point of the user.

The coordinate value calculation unit 250 generates a control signal for controlling the broadcast camera on the basis of the eye-gaze point coordinate by matching between the eye-gaze point of the user and the device coordinate system of the image.

The device control unit 260 may control an operation of the broadcast camera according to the control signal. Here, the device control unit 260 controls an operation of the broadcast camera according to the control signal. An operation of magnifying or reducing the image captured by the broadcast camera may be controlled by the control signal inputted to the device control unit 260. Here, when the user command is inputted through the magnified image, a degree of precision of controlling the broadcast camera by the device control unit 260 may be improved according to a magnification ratio of the image.

Through this operation, the eye-gaze based control device 200 may control a three-dimensional movement of the broadcast camera. Moreover, the eye-gaze based control device 200 may improve the degree of precision of controlling the broadcast camera by controlling the operation of magnifying or reducing the image. Accordingly, the eye-gaze based control device may precisely control an operation of the broadcast camera according to the eye-gaze point of the user.

The operation for controlling the broadcast camera has been exemplarily described. Thus, the eye-gaze based control device may be applied to various devices other than the broadcast camera.

Figure 3:
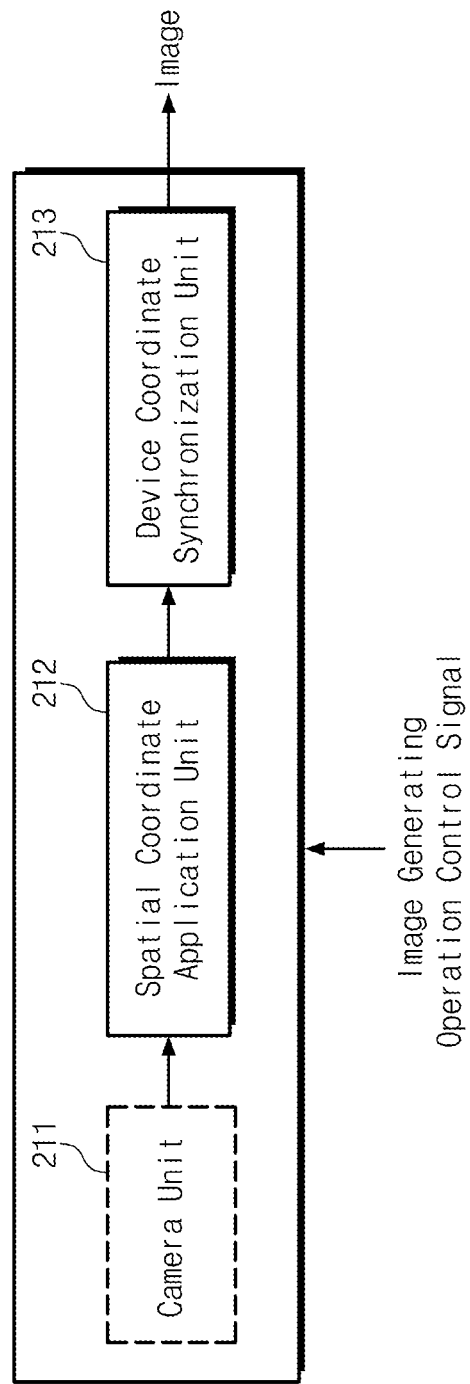
FIG. 3 is a diagram exemplarily illustrating an image generation unit according to an embodiment of the present invention.

FIG. 3 is a diagram exemplarily illustrating the image generation unit according to an embodiment of the present invention.

Referring to FIG. 3, the image generation unit 210 includes a camera unit 211, a spatial coordinate application unit 212, and a device coordinate synchronization unit 213.

The camera unit 211 generates image data by capturing peripheral images. Here, the camera unit 211 may be selectively included in the image generation unit 210, and may be included in the control target device in the case where the control target device is the broadcast camera. The camera unit 211 output the image data to the spatial coordinate application unit 212.

The spatial coordinate application unit 212 applies a spatial coordinate system to the image data. Here, the spatial coordinate system is a coordinate system for an actual space. The spatial coordinate application unit 212 outputs, to the device coordinate synchronization unit 213, the image data to which the spatial coordinate system is applied.

The device coordinate synchronization unit 213 synchronizes the spatial coordinate system of the image data with the device coordinate system. The device coordinate synchronization unit 213 generates the image, i.e. digital image, through the synchronization of the spatial coordinate system and the device coordinate system. The device coordinate synchronization unit 213 outputs the generated image to the image output unit 220.

At least one of the camera unit 211, the spatial coordinate application unit 212, and the device coordinate synchronization unit 213 may receive an image generating operation control signal for magnifying, reducing, or moving the image through the device control unit 260. By virtue of the image generating operation control signal, a size of the image outputted to the user may be adjusted or the image may be moved.

Through this operation, the image generation unit 210 provides, to the user, the image that enables precise control of a device.

Figure 4:
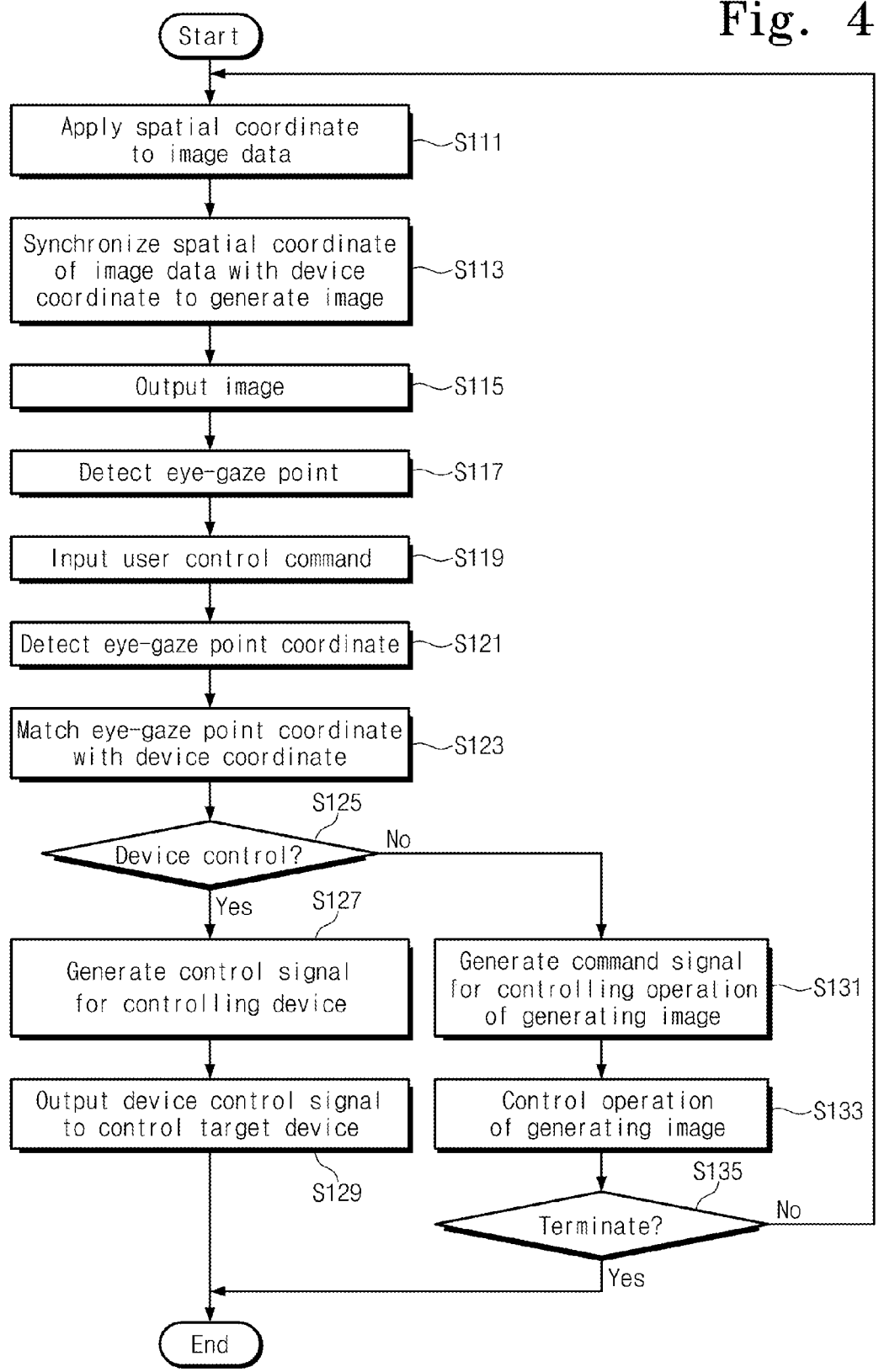
FIG. 4 is a flowchart illustrating an operation of the eye-gaze based control device according to an embodiment of the present invention.

FIG. 4 is a flowchart illustrating an operation of the eye-gaze based control device according to an embodiment of the present invention.

Referring to FIG. 4, the image generation unit 210 applies a spatial coordinate to image data in operation S111. Here, the image generation unit 210 includes a camera and may capture an image of the periphery of the control target device in order to generate the image data.

The image generation unit 210 generates an image by synchronizing the spatial coordinate of the image data with device data in operation S113. The image generation unit 210 provides, to the image output unit 220, the image to be displayed to the user.

The image output unit 220 outputs, i.e. displays the image in operation S115. Here, the user gazes at the outputted image.

Here, the eye-gaze point detection unit 230 detects an eye-gaze point of the user that gazes the image in operation S117. Here, the eye-gaze point detection unit 230 detects the eye-gaze point of the user in real time.

The control command input unit 240 receives a user control command from the user in operation S119. The user control command includes a command for controlling an operation of generating an image displayed for precise control of a device and a device control command for controlling an operation of the device. The control command input unit 240 outputs the user control command to the coordinate value calculation unit 250.

When the user control command is inputted, the eye-gaze point detection unit 230 detects an eye-gaze point coordinate corresponding to the eye-gaze point of the user in operation S121. The eye-gaze point detection unit 230 outputs the detected eye-gaze point coordinate to the coordinate value calculation unit 250.

The coordinate value calculation unit 250 matches the eye-gaze point coordinate with the device coordinate system in the image in operation S123.

The coordinate value calculation unit 250 determines whether the user control command is a command for controlling a device in operation S125.

When the user control command is determined to be a command for controlling a device, as a result of the determination of operation S123, the coordinate value calculation unit 250 generates a control signal for controlling a device through the the eye-gaze point coordinate corresponding to device coordinate system in operation S127. Here, the coordinate value calculation unit 250 outputs the generated control signal to the device control unit 260, and the device control unit 260 generates a device control signal for controlling a device according to the control signal of the coordinate value calculation unit 250.

The device control unit 260 outputs the generated device control signal to the control target device 100 in operation S129.

In the case of not controlling a device (i.e. controlling an operation of generating an image), as a result of the determination of operation S123, the coordinate value calculation unit 250 generates a control signal for controlling an operation of generating an image on the basis of the eye-gaze point coordinate in operation S131. Here, the coordinate value calculation unit 250 outputs the generated control signal to the device control unit 260.

The device control unit 260 generates an image generating operation control signal for controlling an operation of generating an image according to the control signal in operation S133. The device control unit 260 outputs the image generating operation control signal to the image generation unit 210. The image generation unit 210 may perform an operation of magnifying, reducing, or moving an image in response to the image generating operation control signal. In particular, the image generation unit 210 may generate an image magnified on the basis of the eye-gaze point coordinate through the magnification operation in order to precisely control a device. By generating the device control signal through the magnified image as described above, a device may be controlled with a degree of precision corresponding to a magnification ratio of the image. Further, the image generation unit 210 may be additionally provided with information on the magnification ratio according to the magnification or reduction of the image from the user.

The coordinate value calculation unit 250 determines whether to terminate a current operation in operation S135.

In the case where the current operation is not determined to be terminated as a result of the determination of operation S135, a process proceeds to operation S111. By virtue of the proceeding to operation S111, the user control command is received through an image of which a size or location has been controlled through an image magnifying, reducing, or moving (dragging) operation, so as to more precisely control a device.

In the case of terminating the process as a result of the determination of operation S135, the process proceeds to a terminating operation to terminate the process. Here, the process termination may be determined when an additional command is not inputted through the control command input unit 240 for a certain period of time or determined by a termination command inputted through the control command input unit 240

As described above, the eye-gaze based control device 100 may control the control target device 200 according to an eye-gaze point of the user. Here, the eye-gaze based control device 100 controls the control target device 200 by controlling a size of an image displayed to the user, thereby more precisely controlling the control target device.

For example, a specific block of the eye-gaze based control device may be added or removed, and various modifications may be made to the eye-gaze based control device in different cases.

The eye-gaze based control of the present invention controls a device on the basis of an eye-gaze point of a user, and controls the device by controlling a size of an image provided to the user to track the eye gaze of the user. Thus, the device can be precisely controlled.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An eye-gaze based control device comprising:
    an image generation unit configured to create an image by applying a spatial coordinate system to image data and synchronizing a device coordinate system with the spatial coordinate system applied to the image data;
    an image output unit configured to output the image;
    an eye-gaze point detection unit configured to detect an eye-gaze point of the user on the outputted image and detect an eye-gaze point coordinate;
    a control command input unit configured to receive a user control command;
    a coordinate value calculation unit configured to generate a control signal for controlling a device by matching the eye-gaze point coordinate with the device coordinate system based on the user control command, wherein the control signal comprises a signal for controlling one of operations of moving, magnifying and reducing the image on the basis of the eye-gaze point coordinate, wherein the spatial coordinate system corresponds to a physical space, and wherein the device coordinate system corresponds to a frame of reference of the device.

2. The eye-gaze based control device of claim 1, wherein the image generation unit comprises:

a spatial coordinate application unit configured to apply the spatial coordinate system to the image data; and a coordinate synchronization unit configured to generate the image by synchronizing the spatial coordinate system of the image data with the device coordinate system for controlling the device.

3. The eye-gaze based control device of claim 2, further comprising a camera unit configured to generate the image data by capturing an actual image.

4. The eye-gaze based control device of claim 1, wherein the image output unit comprises at least one of a flat panel display and a head mounted display.

5. The eye-gaze based control device of claim 1, wherein, in the control signal for controlling the operation of magnifying the image, a magnification ratio of the image is set on the basis of the eye-gaze point coordinate.

6. The eye-gaze based control device of claim 5, wherein a degree of device control precision of the device control signal is changed according to the magnification ratio when a user command signal is inputted through the image magnified according to the magnification ratio.

7. A device control method of an eye-gaze based control device, comprising: generating an image by synchronizing a device coordinate system with a spatial coordinate system applied to image data;

obtaining an eye-gaze point of a user with respect to the image;

controlling a size of the image on the basis of the eye-gaze point when a user control command for controlling the size of the image is input;

obtaining the eye-gaze point coordinate from the eye-gaze point of the user through output of the size-controlled image;

generating a device control signal for controlling a device by matching the eye-gaze point coordinate with the device coordinate system when a user control command for controlling the device is input; and outputting the generated device control signal to the device to be controlled, wherein the spatial coordinate system corresponds to a physical space, and wherein the device coordinate system corresponds to a frame of reference of the device.

8. The device control method of claim 7, wherein the image data is obtained by capturing an actual image through a camera.

9. The device control method of claim 7, wherein the user control command for controlling the size of the image is a command for performing one of operations of magnifying and reducing the image on the basis of the eye-gaze point coordinate.

10. The device control method of claim 9, wherein the controlling of a size of the image comprises magnifying or reducing the image by a magnification ratio set to control the size of the image on the basis of the eye-gaze point coordinate.

11. The device control method of claim 10, wherein a degree of device control precision of the device control signal is changed according to the magnification ratio when a user command signal is inputted through the image magnified according to the magnification ratio.

12. The device control method of claim 7, further comprising moving the image according to a moving operation when the user control command is for moving the image on the basis of the eye-gaze point coordinate.

13. The eye-gaze based control device of claim 1, wherein the device is a camera that captures the image data.

\* \* \* \* \*